United States Patent Office 3,520,498
Patented July 14, 1970

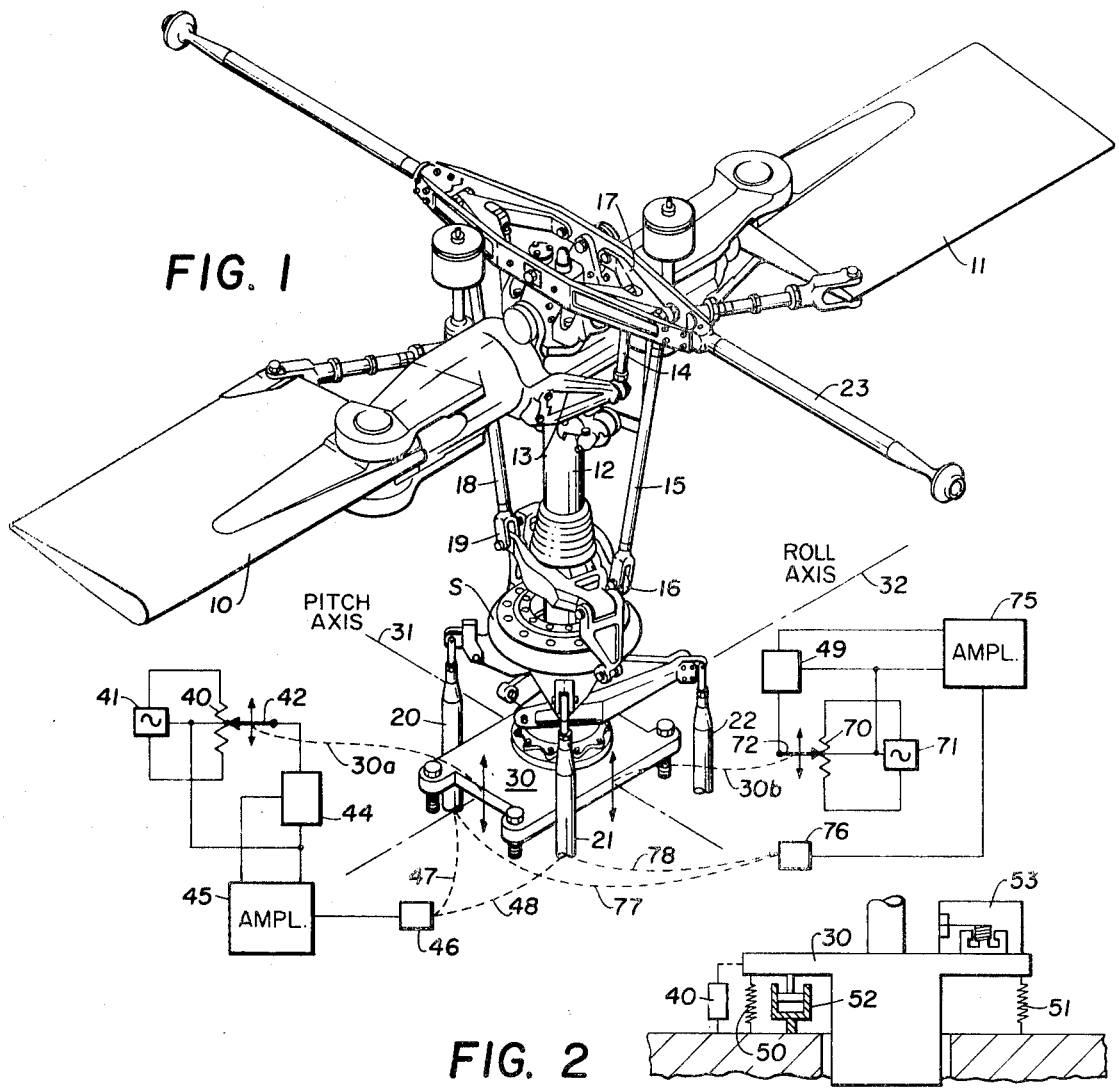
FIG. 1
FIG. 2
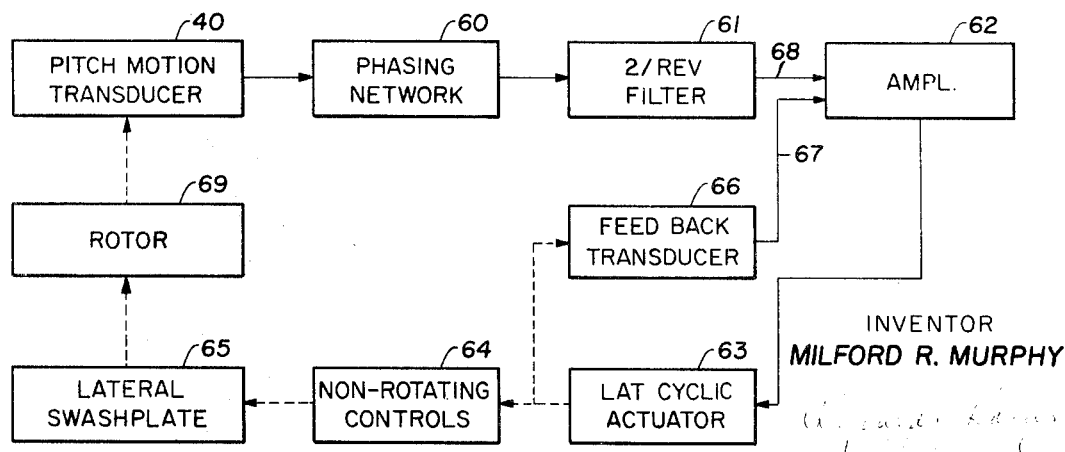
FIG. 3
INVENTOR
MILFORD R. MURPHY
ATTORNEY

3,520,498
STABILIZATION OF AIRCRAFT ROTORS HAVING CYCLIC PITCH
Milford R. Murphy, Arlington, Tex., assignor to Bell Aerospace Corporation, Hurst, Tex., a corporation of Delaware
Filed Dec. 20, 1967, Ser. No. 692,191
Int. Cl. B64c 27/70, 27/74, 27/76
U.S. Cl. 244—17.27          12 Claims

ABSTRACT OF THE DISCLOSURE

An aircraft pylon, having a rotor accommodating cyclic pitch and mounted on a shaft for driving the rotor, is provided with sensor means to generate an output signal dependent upon the rate of change of the position of the shaft axis relative to a first axis perpendicular to the shaft axis with means for introducing cyclic changes in blade pitch on a second axis mutually perpendicular to the first axis and the shaft axis in dependence upon the rate signal.

THE INVENTION

The invention relates to the stabilization of aircraft rotor systems having cyclic pitch, and more particularly to the generation of a signal representing rate of the change in the attitude of the rotor shaft relative to a first control axis for introducing cyclic pitch relative to a second control axis.

Multi-blade aircraft rotor systems mounted at the end of a shaft journaled on a wing or other location on an airframe are more or less resiliently mounted. This is particularly true in rotor systems having provision for cyclic pitch as in a helicopter. Forces encountered by such rotor systems introduce bending moments on the shaft and tend to alter the attitude of the aircraft. Automatic compensation for such forces for enhancement of stability is highly desirable. It has been found that changes in rotor pitch may be introduced to compensate for forces which tend to cause instability. This may be accomplished by proper phasing of the changes in pitch while inttroducing such changes through the same linkages as are employed in effecting cyclic pitch. The invention is directed to the phase change in cyclic pitch of a rotor system to oppose certain forces of unstable character.

SUMMARY

In accordance with the present invention there is provided a means for stabilizing the rotor/pylon assembly on an aircraft where the rotor is provided with cyclic pitch and wherein the rotor is mounted on a drive shaft which in turn is mounted on an air frame. Means are provided to generate an output signal primarily dependent upon the rate of change of the pylon relative to a first to a first axis perpendicular to the axis of the shaft. A swashplate is coupled to the blades cyclically to introduce changes in pitch of the blades for control of the pitch and roll attitude of the air frame. Means are provided responsive to the rate dependent output signal to change the attitude of the swashplate on a third axis mutually perpendicular to the axis of the shaft and said first axis.

THE DRAWINGS

A more complete understanding of the invention and its advantages will be apparent from the following description and claims taken in conjunction with the accompanying drawings in which:

FIG. 1 illustrates a rotor pylon with pitch-roll stabilization;

FIG. 2 is a diagram illustrating a pylon motion transducer installation;

FIG. 3 is a diagram illustrating utilization of the transducer rate signal.

THE PREFERRED EMBODIMENTS

FIG. 1 illustrates a pair of rotor blades 10 and 11 which are mounted on a pylon 12. The rotor blade 10 is coupled through a pitch horn 13 and links 14 and 15 to a pivot 16 in a linkage leading to a swashplate S. Links 14 and 15 are coupled through a lever 17 which is pivotally connected to a stabilizer bar 23. Stabilizer bar 23 acts to stabilize the rotor in space independently of the pylon 12, in the manner set forth in U.S. Pat. No. 2,38,698, now expired, and is not essential to the present invention. Similarly, the pitch of blade 11 is controlled through a linkage including link 18 coupled to the swashplate S at a pivot 19.

The attitude of swashplate S is controlled by adjusting links 20 and 21 by pilot actuation for changing the phase and magnitude of the cyclic pitch of the blades 10 and 11. For lateral cyclic or roll control the links are simultaneously actuated in opposite directions. For longitudinal cyclic or pitch control the links are simultaneously actuated in the same direction.

Collective pitch of blades 10 and 11 is introduced by pilot actuation of the control link 22. Thus, the three input links 20–22 provide for the desired control of the rotor blades 10 and 11.

The pylon 12 is journaled in a base 30 mounted on an air frame with the drive shaft extending down through the base 30 where the shaft is coupled to an engine to power the rotor.

Pylon 12 may be described as having three modes of movement:

(a) angular motion of the pylon about the pylon pitch axis 31;

(b) angular motion of the pylon about the roll axis 32; and (c) a coupled mode wherein the pitch motion is coupled to the roll motion. This coupled mode is termed a "pylon-rock" mode and is generally described as pitch-to-roll-to-pitch.

The stability of the pylon 12 relative to the first two modes is primarily dependent on the stiffness of the pylon mounts, the inertia and damping of the pylon and the rotating system, the pylon to swashplate gain, thrust, and inertia of the fuselage. The coupled mode or the "pylon-rock" mode is dependent on the dynamic characteristics of the first two modes, namely, the relationship of the dynamic characteristics of the first two modes and the rotor coupling. Rotor coupling has been described mathematically. The mathematical expressions involve a term inherent in all helicopter rotor systems including rigid rotors, tail rotors, etc. Rotor coupling is a term which is understood to represent the cyclic effect (or precessing moment) relative to one axis, such as the roll axis, by rotor attitude rate (change in space) in the other other axis, such as the pitch axis. Specifically, when rotor attitude rate is present, i.e. the rotor is undergoing change in position relative to an axis passing through the pylon base, the coupling effect is produced because there exists a difference between (a) the angle of attack on the blade during one-half of the travel of the blade tip in the rotor tip path plane, and (b) the angle of the attack of the blade in the other half of the tip path plane.

More particularly, if the rotor is rotating counterclockwise as viewed from above and there is experienced a "nose-down" rotor attitude rate, the difference in the angle of attack will produce a moment which tends to cause the right blade to be precessed or produce a "right-blade-down" rotor attitude rate in roll. This in turn couples a "nose-up" rotor attitude rate, etc.

From the foregoing it will be understood that there are dynamic forces present involving a rotor coupling mode in which the dynamics of the rotor pitch mode and the rotor roll mode effectively form a closed loop system. The magnitude of the coupling forces which affect the loop gain are primarily dependent upon the magnitude of the rotor attitude rate and the main rotor thrust vector, the latter of which provides an explanation as to why a helicopter at high gross weight or operating in a power climb or high "g" turn is more susceptible to "pylonrock" than the helicopter operating under low gross weight and in relatively straight and level flight.

The greater the number of blades the more vulnerable the rotor is to instability by reason of the rotor/pylon coupling mode although all rotors are vulnerable thereto to a greater or lesser degree. The instability will normally occur at the rotor frequency or at an even-numbered sub-multiple thereof and has been known to occur at a frequency as low as one-fifth of the rotor frequency.

The present invention is directed to the elimination of the tendency to instability by reason of the existence of the coupled mode.

A suitable system for eliminating this instability has been illustrated in FIG. 1, serving to eliminate the pitch-to-roll coupling. More particularly, as shown in FIG. 1 a transducer shown in the form of a center tapped potentiometer 40 is provided with an excitation source 41 and a variable tap 42. The variable tap 42 is mechanically linked to the base 30 of the pylon 12 so that a signal will appear as an output circuit phasing network 44 which is proportional to the pitch rate of the pylon relative to the air frame. The potentiometer 40 is mounted on the air frame and the tap 42 is coupled to the base 30 to produce movement of the tap which generates a signal which is differentiated by phasing network 44 to produce a rate signal.

It will be understood that generally a pylon is mounted on the air frame with some resilience and by reason of such resilience the relative movement between the pylon and the air frame and thus between the transducer elements is permitted.

The rate signal from circuit 44 is employed as one input to amplifier 45, the output of which is then applied through an actuator 46 to links 20 and 21, as indicated by the dotted lines 47 and 48, to change the cyclic pitch on the roll axis in proportion to the pylon rate on the pitch axis. This effectively removes the pitch-to-roll coupling with changes cyclically introduced into the pitch of blades 10 and 11. The cyclic pitch thus produced is over and above any other cyclic control as generally employed in such a rotor system.

In FIG. 2 the pylon-air frame coupling has been shown with the base 30 of the pylon 12 mounted on a spring system, including springs 50 and 51, and with a suitable damper 52 being provided to attenuate the motion. The springs 50 and 51 are mounted on the roll axis. The usual mounting bolts or other anchoring means have not been shown in order to simplify the drawing. A similar set of springs is provided on the pitch axis. The damper 52 will damp motion on the roll axis. A similar damper means is provided for damping motion on the pitch axis.

The transducer 40 is shown coupled between the base 30 and the air frame. The transducer may be any suitable transducer which can be used to produce a signal which is proportional to the rate of change of the base 30 relative to the air frame. In FIG. 1 the transducer has been illustrated as a potentiometer with a differentiating network in the circuit leading to the amplifier 45. Alternatively, the transducer 40 may be of the type which generates a rate signal directly rather than the displacement signal of FIG. 1 which signal must then be differentiated. Velocity transducers, such as transducers 53, may be mounted on the base 30 without coupling to the air frame and produce the desired rate signal.

In FIG. 1 the output of the transducer has been applied through network 44 as one input to amplifier 45. The particular form of system for utilizing the rate signal need not be as illustrated herein but may be any suitable control system for utilizing the rate signal to introduce cyclic pitch. The following description, as it relates to cyclic control system should be taken as representative of suitable systems for implementing the cooperation between rate of the pylon on one axis for introducing cyclic pitch relative to another axis.

The system of FIG. 3 cancels, to an effective degree, the aerodynamic pitch-to-roll coupling term which is inherent in the main helicopter rotor. This is accomplished by utilizing the rotor pitch attitude rate proportionally to displace the swashplate laterally (in roll). This change in swashplate attitude causes a change in pitch in the proper direction to oppose the coupling. Since rotor attitude rate is not easily measured, this system uses properly phased pylon motion relative to the fuselage signal as an approximate rotor attitude rate signal.

In FIG. 3 pitch pylon position is sensed by transducer 40 and phased (differentiated) in order to approximate rotor attitude rate. The phasing is produced in phase network 60. The signal is then passed through the two-per-rev filter 61 and applied to the roll channel amplifier 62 to effect a lateral swashplate displacement. The swashplate displacement is in direction as to cancel the pitch-to-roll coupling in the rotor.

The control system includes a lateral cyclic actuator 63 which operates through non-rotating control 64 to produce movement of the lateral swashplate actuator unit 65. The actuator 63 is provided with a feedback transducer 66 which is coupled back into the amplifier 62 by way of channel 67. Control inputs and other inputs are provided for the amplifier 62 by way of channel 68.

Movement of the lateral swashplate actuator 65 affects the movement of the rotor indicated by the reference character 69, which in turn is mechanically linked through the pylon to the pitch motion transducer 40.

The foregoing description has dealt with the utilization of the rate signal generated by the transducer 40 of FIG. 1. It will now be appreciated that a similar system may be employed to sense roll rate to control cyclic pitch of the rotor on the pitch axis. More particularly, as shown in FIG. 1, a transducer 70 is connected to a source 71 and has a variable tap 72. Motion of the base 30 is transmitted by way of linkage 30b to the variable tap 72. The roll displacement thus sensed by the motion o fthe tap 72 on transducer 70 is applied to network 49 and then to a pitch amplifier 75 which in turn energizes an actuator 76. Actuator 76 is coupled by way of linkages 77 and 78 to control rods 20 and 21, respectively, to introduce the necessary motion cyclically to change the swashplate relative to the pitch axis 31.

While the single system involving transducer 40 will be effective to eliminate the undesired coupling, the utilization of the two systems shown in FIG. 1 cooperate to sense and correct the undesired coupling more rapidly. Thus, where the coupling problem may be severe, the two axis installation would be preferred to the single control system.

In the foregoing description it was indicated that the pylons generally are mounted on an air frame with some degree of resilience. In some helicopters, such as the two-bladed, semi-rigid type manufactured by Bell Helicopter Company of Fort Worth, Tex., the mounting is purposely designed to be more resilient than in many other models of aircraft of helicopter configuration. In either case, the present invention will be found to be useful. In aircraft where the pylon is more rigidly secured to the air frame, the pitch-roll-pitch coupling still will exist. Utilization of a transducer to sense rotor attitude rate for introducing cyclic pitch as above described will be effective to keep the resulting moment out of the air frame. This, it will be apparent that the invention is not limited to those instances where a pylon is by design provided with substantial resilience in its mounting to the air frame.

Having described the invention in connection with certain specific embodiments thereof, it is to be understood that further modifications may now suggest themselves to those skilled in the art.

What is claimed is:
1. A stabilizing system for a rotor/pylon assembly on an aircraft which comprises:
   (a) transducer means coupled to said rotor/pylon assembly to generate an output signal primarily dependent upon rate of change of the movement of said rotor/pylon assembly relative to the air frame of said aircraft about a first axis, and
   (b) control means connected to said rotor and responsive to said output signal to introduce a control force in said rotor about a second axis substantially perpendicular to said first axis.

2. A stabilizing system for a rotor/pylon assembly on an aicraft provided with means to change pitch of the rotor blades cyclically, which comprises:
   (a) transducer means coupled to said rotor/pylon assembly to generate an output signal primarily dependent upon rate of change of the movement of said rotor/pylon assembly relative to the air frame of said aircraft about a first axis, and
   (b) cyclic control means connected to said rotor and responsive to said output signal to introduce cyclic control to said rotor with relation to a second axis substantially perpendicular to said first axis.

3. A stabilizing system for a rotor on an aircraft provided with pitch changeable rotor blades which comprises:
   (a) a pylon for mounting said rotor on said aircraft,
   (b) transducer means coupled to said pylon to generate an output signal primarily dependent upon rate of change of the movement of said pylon relative to the air frame of said aircraft about a first axis which is substantially perpendicular to the axis of said pylon,
   (c) first control means coupled to said blades to introduce cyclic changes in pitch of said blades for independent control of attitude of said craft, and
   (d) second control means coupled to said pylon and said first control means for introducing differential pitch change to said blades with relation to a second axis substantially perpendicular to said first axis in dependence upon said output signal.

4. A stabilizing system for a rotor/pylon assembly on an aircraft provided with means to change pitch of the rotor blades cyclically, which comprises:
   (a) a pylon for mounting said rotor on said aircraft,
   (b) transducer means coupled to said pylon to generate an output signal primarily dependent upon rate of change of the movement of said pylon relative to the air frame of said aircraft about a first axis which is perpendicular to the axis of said pylon.
   (c) a swashplate on said pylon coupled to said blades to introduce cyclic changes in pitch of said blades for independent control of the pitch and roll attitudes of said aircraft, and
   (d) control means for changing the attitude of said swashplate on a second axis mutually perpendicular to said first axis and said pylon axis in dependence upon said output signal.

5. The combination set forth in claim 4 wherein said transducer means is responsive to a movement of said plyon along the longitudinal axis of said aircraft and said control means is coupled to said swashplate to actuate said swashplate on an axis transverse of said aicraft.

6. The combination set forth in claim 4 wherein said transducer means is responsive to a movement of said pylon along the transverse axis of said aircraft and said control means is coupled to said swashplate to actuate said swashplate on an axis longitudinal of said aircraft.

7. The combination set forth in claim 4 wherein said pylon is provided for the main rotor of a helicopter.

8. The combination set forth in claim 4 wherein said pylon is provided for support of the tail rotor of a helicopter.

9. The combination set forth in claim 4 wherein said pylon is provided with a base resiliently mounted on said aircraft and wherein said transducer is coupled between said base and said aircraft to actuate said transducer in dependence upon relative motion between said base and said aircraft.

10. The combination set forth in claim 9 wherein said transducer is located to sense movement on the roll axis.

11. The combination set forth in claim 9 wherein said transducer is located to sense movement on the pitch axis.

12. A stabilizing system for a rotor/pylon assembly on an aircraft which comprises:
   (a) a first transducer means coupled to said rotor/pylon assembly to generate a first output signal primarily dependent upon the rate of change of the movement of said rotor/pylon relative to the air frame of said aircraft about a first axis which is perpendicular to the axis of said rotor,
   (b) a first control means connected to said rotor and responsive to said first output signal to induce a control force in said rotor about a second axis, substantially perpendicular to said first axis and to said rotor axis,
   (c) a second transducer means coupled to said rotor/pylon assembly to generate a second output signal primarily dependent upon the rate of change of the movement of said rotor/pylon assembly relative to the air frame of said aircraft about a said second axis, and
   (d) a second control means connected to said rotor and responsive said second output signal to induce a control force in said rotor about said first axis.

References Cited

UNITED STATES PATENTS

| | | | |
|---|---|---|---|
| 3,010,679 | 11/1961 | Kelley | 244—17.13 |
| 3,050,276 | 8/1962 | Wissinger | 244—17.13 |
| 3,100,610 | 8/1963 | Armstrong | 244—17.25 |
| 3,118,504 | 1/1964 | Gresap | 170—160.25 |
| 3,120,276 | 2/1964 | Culver et al. | 170—160.25 |
| 3,429,376 | 2/1969 | Hohenemser | 170—160.25 |

FOREIGN PATENTS 1,081,341    8/1967    Great Britain.

MILTON BUCHLER, Primary Examiner

P. E. SAUBERER, Assistant Examiner

U.S. Cl. X.R.

170—160.13

PO-1050
(5/69)

UNITED STATES PATENT OFFICE
CERTIFICATE OF CORRECTION

Patent No. 3,520,498        Dated July 14, 1970

Inventor(s) Milford R. Murphy

It is certified that error appears in the above-identified patent and that said Letters Patent are hereby corrected as shown below:

Col. 1, line 42, "inttroducing" should be -- introducing --

Col. 1, line 55, after "to a first" omit -- to a first --

Col. 2, line 12, U.S. Pat. No. "2,38,698" should be -- 2,368,698 --

Col. 2, line 57, after "other" omit -- other --

Col. 4, line 49, "o fth" should be -- of the --

Col. 4, line 74, "This" should be -- Thus --

Col. 5, line 59, "attitudes" should be -- attitude --

Col. 6, line 30, after "rotor/pylon" insert -- assembly --

Col. 6, line 46, after "responsive" insert -- to --

SIGNED AND SEALED
OCT 13 1970

(SEAL)
Attest:
Edward M. Fletcher, Jr.
Attesting Officer

WILLIAM E. SCHUYLER, JR.
Commissioner of Patents